(12) United States Patent
Kime

(10) Patent No.: US 6,736,153 B1
(45) Date of Patent: May 18, 2004

(54) BRINING SYSTEM, METHOD, AND APPARATUS

(75) Inventor: James A. Kime, Columbus, OH (US)

(73) Assignee: H.Y.O., Inc., Columbus, OH (US)

( * ) Notice: Subject to any disclaimer, the term of this patent is extended or adjusted under 35 U.S.C. 154(b) by 480 days.

(21) Appl. No.: 09/961,469

(22) Filed: Sep. 24, 2001

(51) Int. Cl.[7] .............................. E03B 1/00; F17D 1/00
(52) U.S. Cl. ........................... 137/3; 137/91; 210/96.1; 422/902
(58) Field of Search ...................... 137/3, 91; 210/96.1; 422/902

(56) References Cited

U.S. PATENT DOCUMENTS

| | | | |
|---|---|---|---|
| 1,892,839 A | 1/1933 | Howard | |
| 2,917,465 A | 12/1959 | Begley | 252/430 |
| 3,186,423 A | 6/1965 | Davidson et al. | 137/91 |
| 3,814,320 A | 6/1974 | Skurray | 239/127 |
| 4,000,657 A | 1/1977 | Ponsar | 73/448 |
| 4,072,435 A | 2/1978 | Coho et al. | 404/110 |
| 4,172,499 A | 10/1979 | Richardson et al. | 169/53 |
| 4,209,258 A | 6/1980 | Oakes | 366/138 |
| 4,430,240 A | 2/1984 | Sandvig et al. | 252/70 |
| 4,573,802 A | 3/1986 | Kerrigan et al. | 366/152 |
| 4,842,005 A | 6/1989 | Hope et al. | 137/101.19 |
| 5,447,063 A | 9/1995 | Glassey | 73/437 |
| 5,551,468 A | 9/1996 | Lemke | 137/3 |
| 5,599,475 A | 2/1997 | Ossian et al. | 252/70 |
| 5,792,343 A * | 8/1998 | Fujita et al. | 210/96.1 |
| 5,868,327 A | 2/1999 | Dawson | 241/44 |
| 5,900,547 A | 5/1999 | Bartkiewiez | 73/447 |
| 6,068,200 A | 5/2000 | Kime | 239/7 |
| 6,129,106 A | 10/2000 | Kornelson et al. | 137/91 |
| 6,439,252 B1 * | 8/2002 | Kephart | 137/3 |

* cited by examiner

*Primary Examiner*—William Wayner
(74) *Attorney, Agent, or Firm*—Mueller and Smith, LPA (57) ABSTRACT

Method for making salt brine of a desired concentration wherein tap water and recycle dilute brine is passed from a sump tank located indoors into a mixing tank located outdoors. A dilute brine flow from the mixing tank is passed into the sump tank. The concentration of the brine in the sump tank is monitored with a floatable container filled with desired concentration brine. As soon as the container floats in the brine in the sump tank, the brine in the mixing tank is passed into a brine storage tank located outdoors. The salt brine manufacturing system for implementing the method also is disclosed.

20 Claims, 8 Drawing Sheets

BRINING SYSTEM, METHOD, AND APPARATUS

CROSS-REFERENCE TO RELATED APPLICATIONS

STATEMENT REGARDING FEDERALLY SPONSORED RESEARCH

Not applicable.

BACKGROUND OF THE INVENTION

The present invention generally relates to highway snow and ice control and more particularly to the production of brine therefor.

Highway snow and ice control frequently is carried out by governmental authorities with the use of dump trucks, which are seasonally modified by the addition of snow-ice treatment components. Operating systems employed for these snow and ice control implements have been substantially improved over the past decade. An initial such improvement has been achieved through the utilization of microprocessor driven controls over the hydraulics employed with the seasonally modified dump trucks. See, for example, U.S. Pat. Nos. Re 33,835 and 5,318,226. This latter approach, for example, sometimes is referred to as a "zero-velocity" method for salt distribution.

Investigations into techniques for controlling snow-ice pavement envelopment have recognized the importance of salt in the form of salt brine in breaking the bond between ice and the underlying pavement. Without a disruption of that bond, little improvement to highway traction will be achieved. For example, the plow merely will scrape off the snow and ice to the extent possible, only to leave a slippery coating which may be more dangerous to the motorist than the pre-plowed road condition.

When salt has been simply broadcast over an ice-laden pavement from a typical spinner, it will have failed to form a brine of sufficient salt concentration to break the ice-pavement bond. The result usually is an ice coated pavement, in turn, coated with a highly dilute brine solution developed by too little salt, which will have melted an insufficient amount of ice for traction purposes. This condition is encountered often where granular salt material contains a substantial amount of "fines". Fines are very small salt particles typically generated in the course of transporting, stacking, and storing road maintenance salt in dome-shaped warehouses and the like.

Road snow-ice control studies have revealed that the activity of ice melting serving to break the noted ice-pavement bond is one of creating a saltwater brine of adequate concentration. In general, an adequate salt concentration using conventional dispersion methods requires the distribution of unacceptable quantities of salt on the pavement. Some investigators have employed saturated brine as the normal treatment modality by simply pouring it on the ice covered highway surface from a lateral nozzle-containing spray bar mounted behind a truck. A result has been that the thus-deposited brine concentration essentially immediately dilutes to ineffectiveness at the ice surface, with a resultant dangerous liquid-coated ice highway condition.

Attempting to remove ice from pavement by dissolving the entire amount present over the entire expanse of pavement to be treated is considered not to be acceptable from an economical standpoint. For example, a one mile, 12 foot wide highway lane with a ¼ inch thickness of ice over it should require approximately four tons of salt material to make a 10% brine solution and create bare pavement at 20° F. Technical considerations for developing a salt brine effective to achieve adequate ice control are described, for example, by D. W. Kaufman in "Sodium Chloride: The Production and Properties of Salt and Brine", *Monograph Series* 145 (Amer. Chem. Soc. 1960).

The spreading of a combination of liquid salt brine and granular salt has been considered advantageous. In this regard, the granular salt may function to maintain a desired concentration of brine for attacking the ice-pavement bond and salt fines are more controlled by dissolution in the mix. The problem of excessive salt requirements remains, however, as well as difficulties in mixing highly corrosive brine with particulate salt. Typically, nozzle injection of the brine is the procedure employed. However, attempts have been made to achieve the mix by resorting to the simple expedient of adding concentrated brine over the salt load in a dump bed. This approach is effective to an extent. However, as the brine passes through the granular salt material, it dissolves the granular salt such that the salt will not remain in solution and will recrystallize, causing bridging phenomena and the like inhibiting its movement into a distribution auger.

A practical technique for generating a brine of sufficient concentration to break the ice-pavement bond is described in U.S. Pat. No. 5,988,535. With this technique, ejectors are employed to deposit a salt-brine mixture upon a highway as a relatively narrow, continuous and compact band of material. To achieve such narrow band material deposition at practical highway speeds of 40 mph or more, the salt-brine mixture is propelled from the treatment vehicle at a velocity commensurate with that of the vehicle itself and in a direction opposite that of the vehicle. Further, the material is downwardly directed at an acute angle with respect to the plane defined by the pavement. When the salt-brine narrow band is deposited at the super-elevated side of a highway lane, the resultant concentrated brine from the band is observed to gravitationally migrate toward the opposite or downhill side of the treated lane to provide expanded ice clearance. The result is a highly effective snow-ice treatment procedure with an efficient utilization of salt materials. Because the lanes of modern highways are super-elevated in both a right and a left sense, two spaced apart salt ejectors are employed to deposit the narrow band concentration at positions corresponding with the tire tracks of vehicles located at the higher or elevated portion of a pavement lane. A feature of the apparatus of this system is its capability for being mounted and demounted upon the dump bed of a conventional highway maintenance truck in a relatively short interval of time. As a consequence, these dump trucks are readily available for carrying out tasks not involving snow-ice control. Additionally, the apparatus is configured such that the dump beds remain in a lowered or down position throughout their use, thus improving the safety aspect of their employment during inclement winter weather.

Regardless of the snow/ice control technique chosen, the brine still must be manufactured. The manufacture of brine at a central station remains the practical technique of choice for most governmental highway organizations. Practical problems exist, however, in this regard since the brining forming operation should be kept indoors to prevent lines from freezing and for worker safety and comfort. Operation of a front-end loader to move the piles of salt crystals necessary for such brine forming operation, however, can be dangerous if practiced indoors. Then, too, the final brine need not be kept inside, as it needs to be loaded onto the salt-spreader trucks. It is to such operations that the present invention is addressed.

BRIEF SUMMARY OF THE INVENTION

An system for making brine for use, for example, by state highway departments to de-ice roads is disclosed. The system employs an outdoor hopper into which a front-end loader can load salt (e.g, NaCl crystals or pellets). Located indoors is a sump tank. Tap water and make-up (recycle) brine from the sump tank is pumped from indoors to the outdoor mixing tank to make fresh brine. Brine from the outdoor mixing tank flows back into the sump tank. Located inside the sump tank is a plastic jug filled with the 23.3% NaCl eutectic brine that is desired to be made from the salt in the outdoor hopper. The flows to and from the outdoors mixing tank and indoor sump tank continue until the correct concentration of brine is present in the indoor sump tank. As soon as the sump tank has the correct concentration of brine in it, the plastic jug is buoyed (match in density), which automatically activates a switch that permits the brine in the mix tank to be pumped to the brine storage tank(s) for loading into trucks for dispensing onto highways.

The salt brine manufacturing system for implementing the salt brine method includes a mixing tank connected to a source of tap water and to a source of dilute brine. A sump tank for supplying dilute brine to the mixing tank is fitted with a brine product sensor for determining whether the brine therein has a desired concentration of salt to make a brine product. A recirculation pump for passing the source of tap water and the dilute brine from the sump tank to the mixing tank is provided. A storage tank is provided. Finally, a pump is provided for passing a brine product from the mixing tank to the storage tank.

Advantages of the present invention include a worker safety manufacturing operation for the preparation of salt brine. Another advantage is a simple, yet reliable technique for the preparation of salt brine. A further advantage is the ability to make a salt brine of desired precise salt concentration. These and other advantages will be readily apparent to those skilled in the art based on the disclosure set forth herein.

BRIEF DESCRIPTION OF THE DRAWINGS

For a fuller understanding of the nature and advantages of the present invention, reference should be had to the following detailed description taken in connection with the accompanying drawings, in which.

The drawings will be described in detail below.

DETAILED DESCRIPTION OF THE INVENTION

Figure 9:
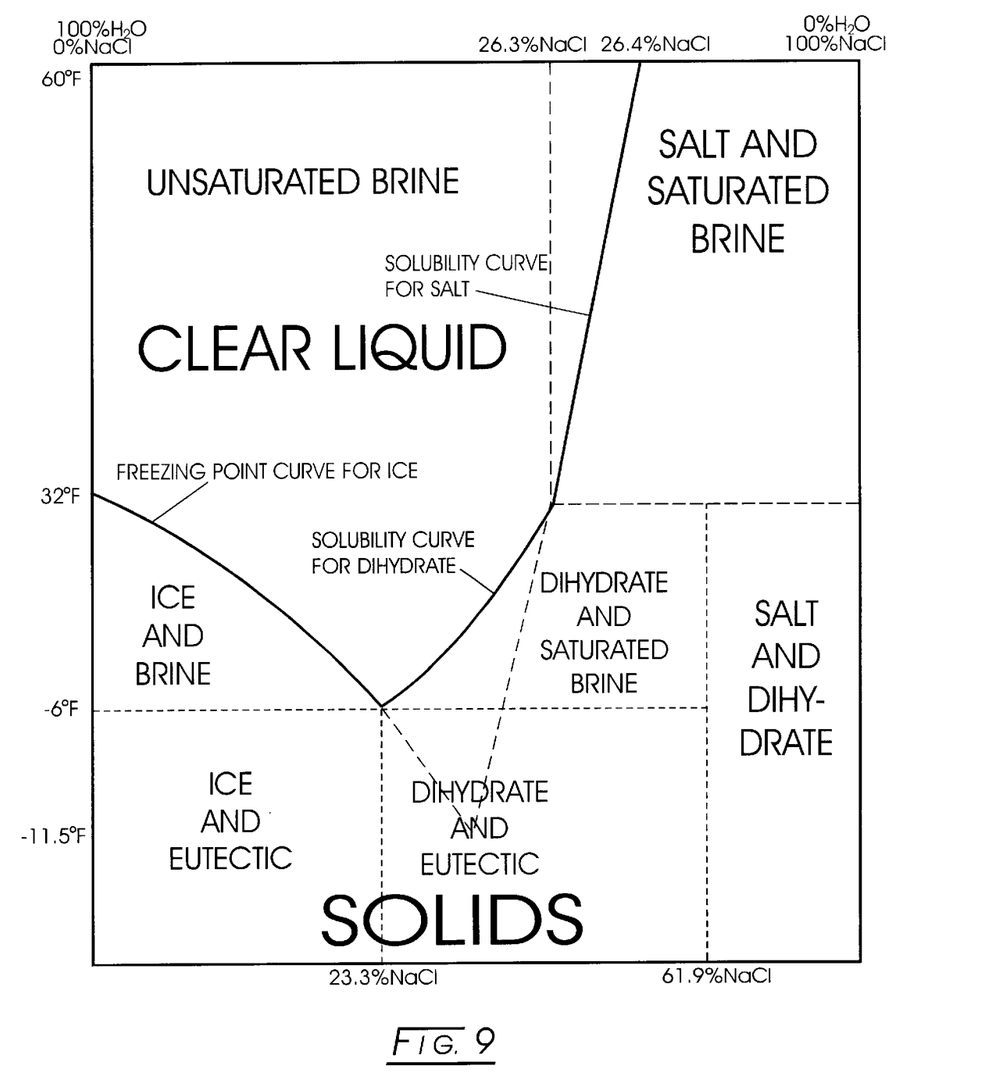
FIG. 9 is the $NaCl/H_2O$ phase diagram.

While a variety of NaCl concentrations in the brine will be suitable for use in treating ice/snow covered roadways, the ideal concentration will be about 23.3% NaCl according to the $NaCl/H_2O$ phase diagram in FIG. 9. Thus, the present brine forming system is designed for production of such eutectic composition. It will be recognized, however, that other NaCl concentrations also will depress the freezing point of the brine and are included within the precepts of the present invention.

Figure 1:
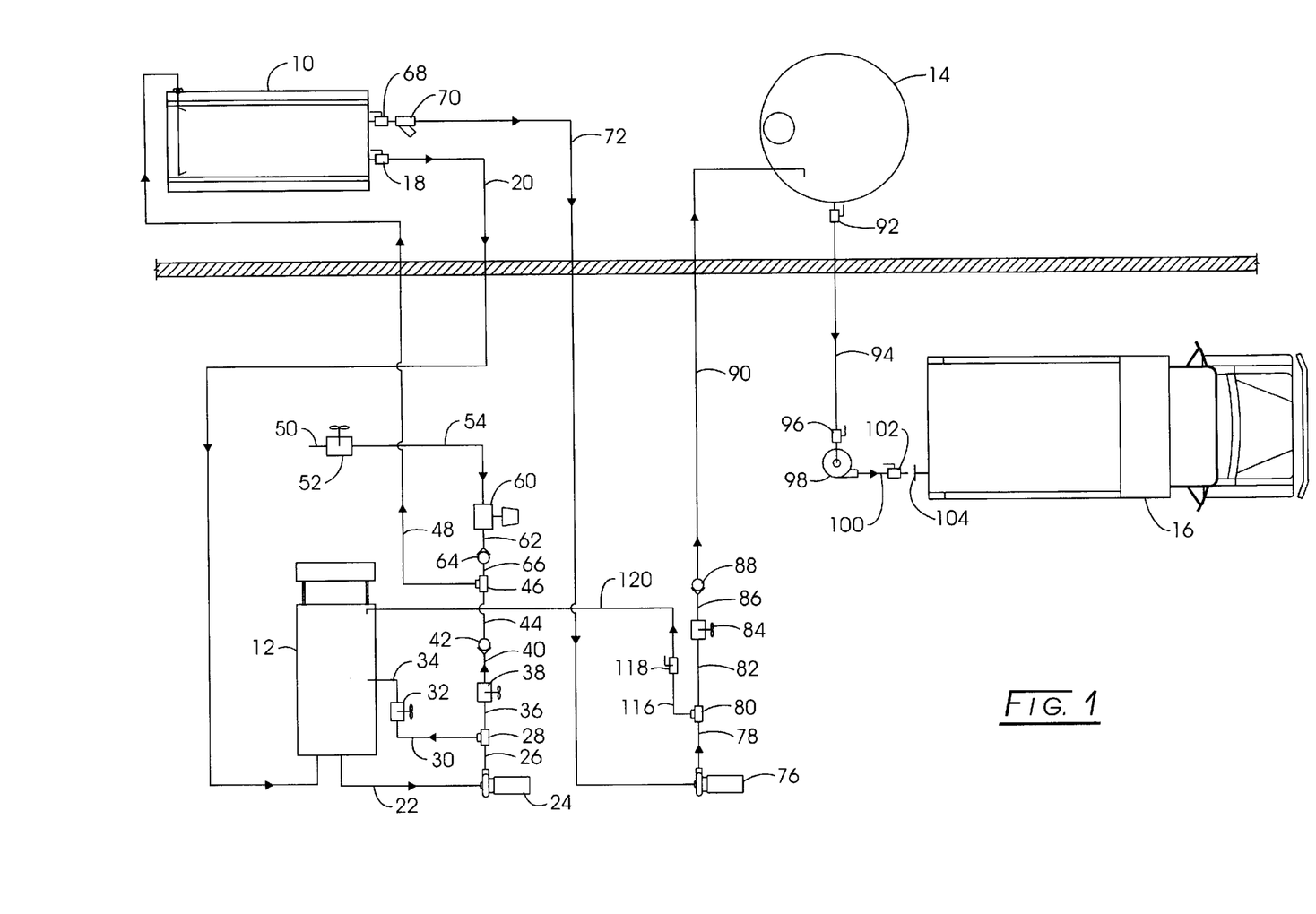
FIG. 1 is a piping schematic of the brine forming system of the invention.

Referring initially to FIG. 1, the major components of the brine forming system are a mixing (brine forming) tank, 10, a sump (or accumulation) tank, 12, and a brine storage tank, 14. For worker safety, efficiency, and economy, mixing tank 10 and storage tank 14 are located outdoors, while sump tank 12 is located indoors. It should be recognized, however, that all of these tanks could be located indoors.

Mixing tank 10 has a design capacity of about 8 yd$^3$ and is nominally about 10 ft×4 ft×5.5 ft. Sump tank 12 is smaller, being nominally about 2 ft×2 ft×4 ft. Storage tank 14, which may be composed of more than one tank, has design capacity of about 6,000 gallons.

The various lines, valves, and pumps used to transport materials (water, brine) are depicted in FIG. 1. Under proper operating conditions, the system produces brine automatically with only oversight provided by maintenance workers. Intervention only is required at tank 10 where feed NaCl is dumped by a front-end loader or other conventional equipment. Conveyors could be used if the extra cost could be justified. The second junction for routine worker intervention is the filling of the brine trucks, such as a truck, 16, shown in FIG. 1. Of course routine maintenance of all of the tanks, lines, valves, pumps, etc., will be required.

With respect to the construction of the brine forming system, weak brine solution is withdrawn from mixing tank 10 through a ball valve, 18, via a 3" line, 20, and passed into sump tank 12. Tank 12 is fitted with an internal recirculation loop for brine housed in tank 12 and composed of a 1½" discharge line, 22, a recirculation pump, 24, a 1½" line 26, a tee, 28, a 1½ line, 30, a globe valve, 32, and an inlet ½" line, 34. Alternatively, weak brine can be recirculated back to mixing tank 10 from tee 28 via a line, 36, a globe valve, 38, a line, 40, a check valve, 42, a line, 44, a tee, 46, and an inlet line, 48. Make-up tap water can be admitted for recirculation to tank 10 via line 48. Such tap water is admitted to system through a line, 50, and is passed through a globe valve, 52, into a line, 54, through a solenoid, 60, into a line, 62, through a check valve, 64, and into a line, 66, which is connected to tee 46 from whence the tap water can flow into line 48 for mixing with the dilute brine being recirculated from tank 12.

Product brine is withdrawn from mixing tank 10 via a ball valve, 68, and through a strainer, 70. From there the product brine flows through a line, 72, and into a transfer (to storage) pump, 76. Pump 76 pumps the product brine through a line, 78, and into a tee, 80. From tee 80, the product brine flows via a line, 82, through a globe valve, 84, a line, 86, through a check valve, 88, and finally into an inlet line, 90, for admission into storage tank 14.

For analysis of product brine in line 78, a line, 116, runs from tee 80 to a sampling valve, 118, from which a sample of brine product can be withdrawn for analysis. A line, 120, from sampling valve 118 returns brine product in line 116 to vessel 122 of sump tank 12.

For use of the product brine by truck 16, product brine in storage tank 14 is passed through a ball valve, 92, into a line, 94, through a second ball valve, 96, and into a pump, 98. Pump 98 pumps the brine product through a line, 100, and through a ball valve, 102. The line from ball valve 102 hooks to a truck inlet, 104, for the brine product to be loaded onto truck 16.

Figure 2:
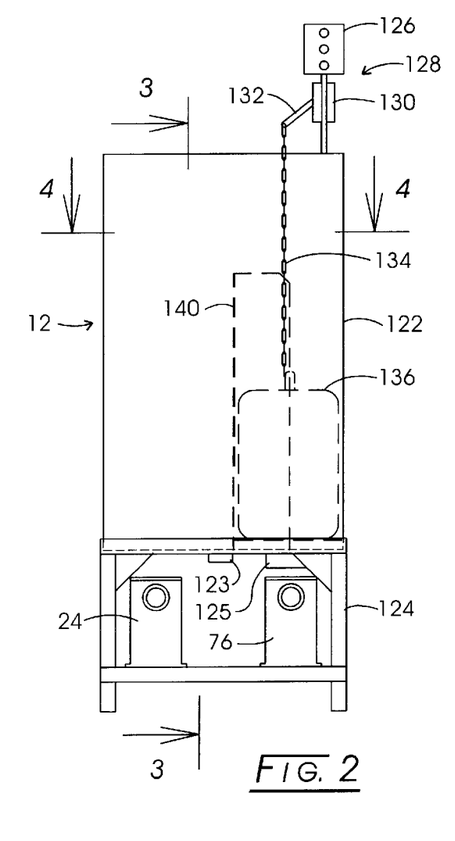
FIG. 2 is a side elevational view of the sump tank.
Figure 3:
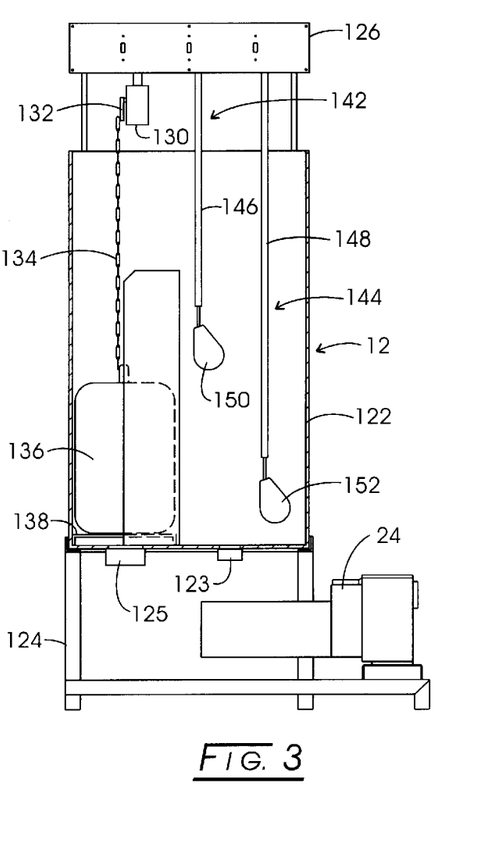
FIG. 3 is a sectional view taken along line 3—3 of FIG. 2.
Figure 4:
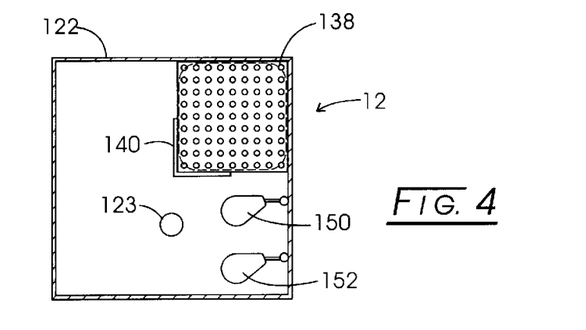
FIG. 4 is a sectional view taken along line 4—4 of FIG. 2.

With respect to design of various tanks, reference initially is made to FIGS. 2–4, which depict sump tank 12, which is seen to include an upper vessel, 122, mounted atop a frame, 124, with a lower, gravity fed brine outlet, 123, and an inlet, 125. Pumps 24 and 76 are seen mounted to frame 124 underneath vessel 122. Vessel 122 is seen to carry an electrical panel, 126, from which three switching mechanisms are disposed. The first switching mechanism, 128, is seen to include a switch box, 130, from which extends a lever, 132, at its proximal end. Lever 132 carries a chain, 134, at its distal end. The distal end of chain 132 is connected to a float assembly, 136, which rests on a screen or foraminous plate, 138 (see FIG. 4). Float 136 is housed within an angle, 140, which confines float 136 to moving up and down, rather than into the main body of vessel 122. Float 136 is filled with the brine desired to be made (e.g., brine product containing 23.3% NaCl). When the brine solution in vessel 122 contains the same concentration of brine as is in float 136, float 136 floats due to the density match. Before such concentration is achieved, float 136, rests atop screen 138. When float 136 rises (floats), lever 132, also rises, which trips the switch in switch box 130. Obviously, this means that the correct brine solution has been made so that the brine can be sent to storage tank 14.

Vessel 122 also is seen fitted with two other switch mechanisms, 142 and 144, carried by switch panel 126. Each of these switch mechanisms 142 and 144, respectively, is seen to consist of a rod, 146 and 148, extending downwardly from switch panel 126 into vessel 122. The lower ends of each rod 146 and 148, respectively, are fitted with a float switch, 150 and 152. Float switches 150 and 152 float on top of the brine housed in vessel 122 and serve as high and low brine indicators, respectively. That is, when float 150 rises with the upper surface of brine in vessel 122, a switch is activated to stop additional brine and/or tap water from being admitted thereinto. By the same token, float 152 is an indicator of a minimum amount of brine solution being present in vessel 122. With too little brine in vessel 122, the recirculation (pump 24 will shut off. When a minimum level is present, the recirculation will activate.

Figure 5:
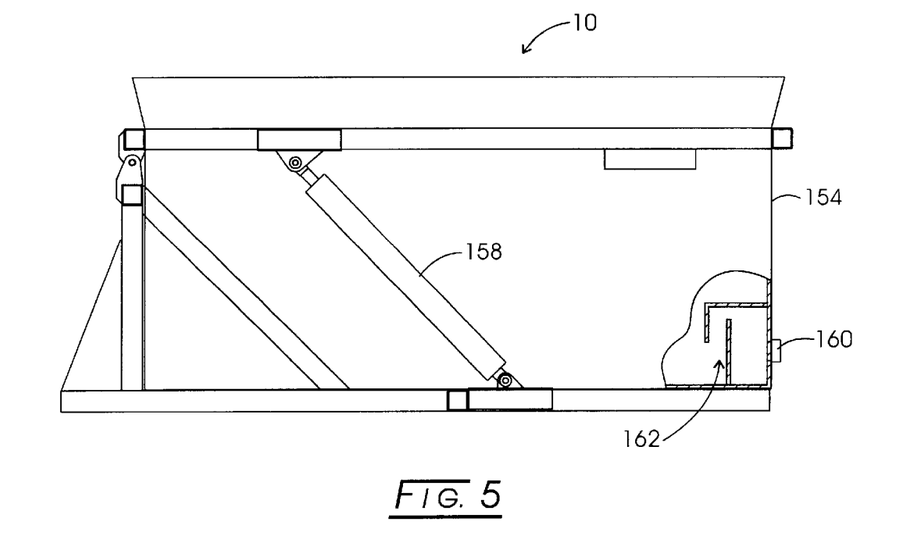
FIG. 5 is a side elevational view of the mixing tank.
Figure 6:
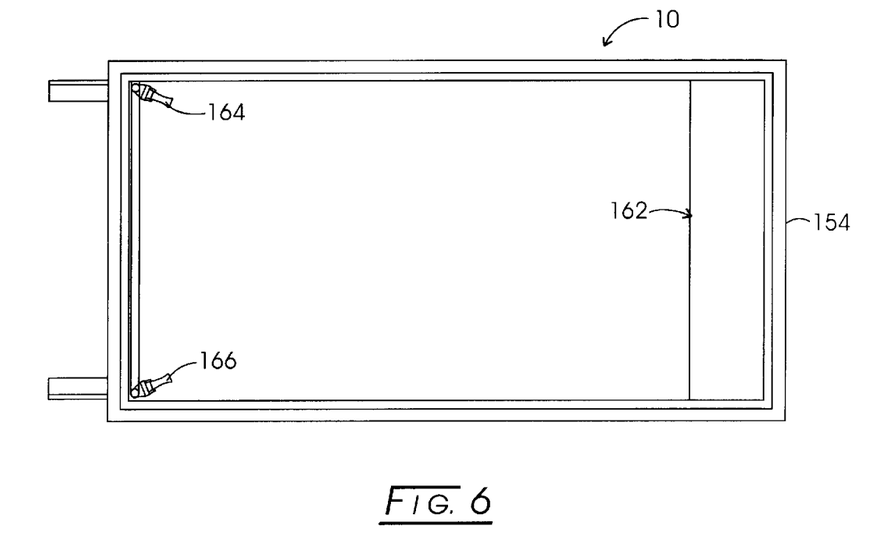
FIG. 6 is a top view of the mixing tank with a partial cut-away at the brine outlet.
Figure 7:
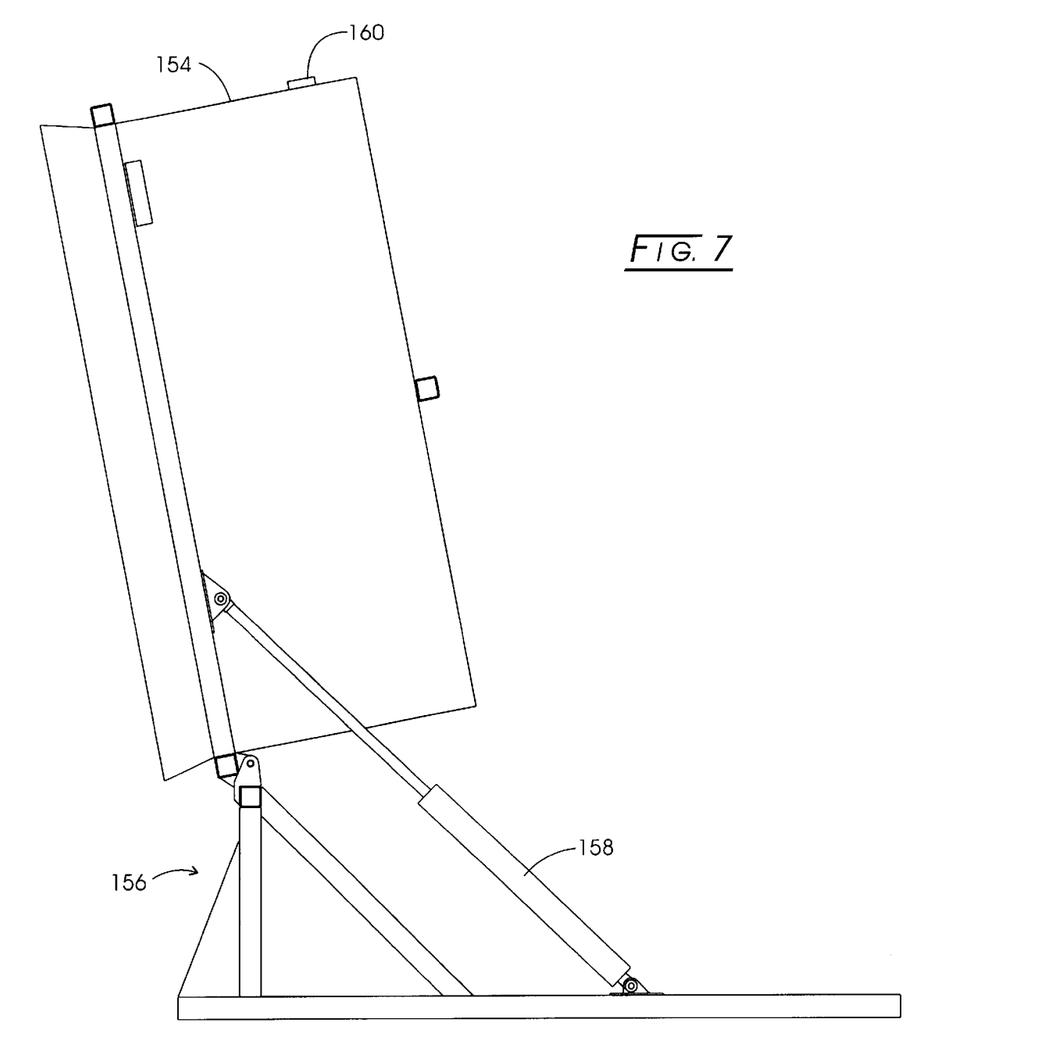
FIG. 7 is a side elevational view of the mixing tank of FIG. 5 in a dumping position.

Referring to FIGS. 5, 6, and 7, mixing tank 10 is seen to include a vessel, 154, which sits atop a frame assembly, 156 (see FIG. 7), which includes a piston, 158, for dumping the contents of vessel 154. Such dumping may be necessary since vessel 154 is located outdoors, has not lid, and has salt dumped into it from a front-end loader. It is expected that a certain amount of debris will be dumped in with the salt and other sources, and collect in vessel 154. Thus, extension of piston 158 enables the debris to be dumped out of vessel 154.

In FIG. 5, about the outlet, 160, a weir assembly, 162, provides a flow path calculated to keep debris from being withdrawn along with the brine solution being made in vessel 154. Mixing in vessel 154 is accomplished with a pair of nozzles, 164 and 166 (see FIG. 6) through which recycled weak brine, optionally with make-up water, is admitted into vessel 154.

Figure 8:
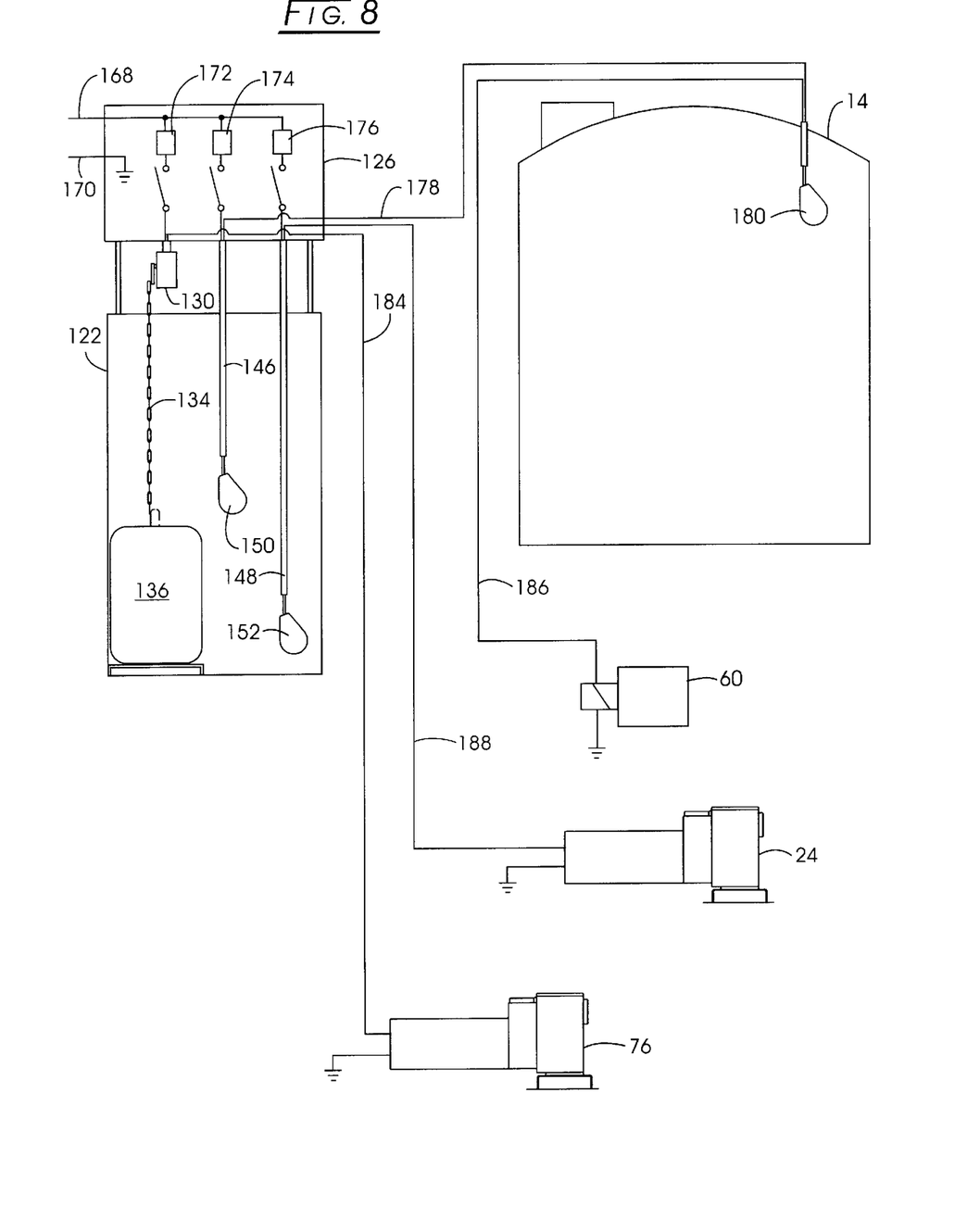
FIG. 8 is an electrical schematic diagram for the sump and storage tanks.

The electrical schematic for the system is shown in FIG. 8. Referring initially to electrical panel 126, a source of line power, 168, and ground, 170, pass into panel 126 with line power 168 terminating at three switches (so-called single throw switches), 172, 174, and 176, which advantageously are connected to ground fault interrupts (not shown in the drawings). When the inventive brining system initially is activated, the operator "throws" or closes all three switches 172, 174, and 176. Switch box 130 is a normally open switch. A line, 184, connects switch 130 to pump 76. When float 136 rises in vessel 122, switch 130 is actuated and pump 76 commences to pump brine product from mixing tank 10 to storage tank 14.

High water switch 150 (a normally closed switch) is connected to switch 174 and via a line, 178, to float switch (normally closed), 180, in storage tank 14. Float switch 180 in turn is connected via a line, 186, to solenoid 60. If either float switch 150 or float switch 180 is actuated, then solenoid 60 is turned off, because one of float switches 150 or 180 is opened. When solenoid 60 is actuated and the flow of tap water from line 50 is ceased because either vessel 122 or storage tank 14 is at its operating capacity.

Low water switch 152 (a normally open switch) is connected to switch 176 and via a line, 188, to circulation pump 24. When switch 152 is activated by the presence of a minimum amount of water/brine in vessel 122, circulation pump 24 is turned on to circulate weak brine between mixing tank 10 and sump tank 12, and continues even when storage tank 14 is full.

Also, all pumps, solenoids, and other electrical equipment also are connected to ground, as shown in the drawings.

Figure 10:
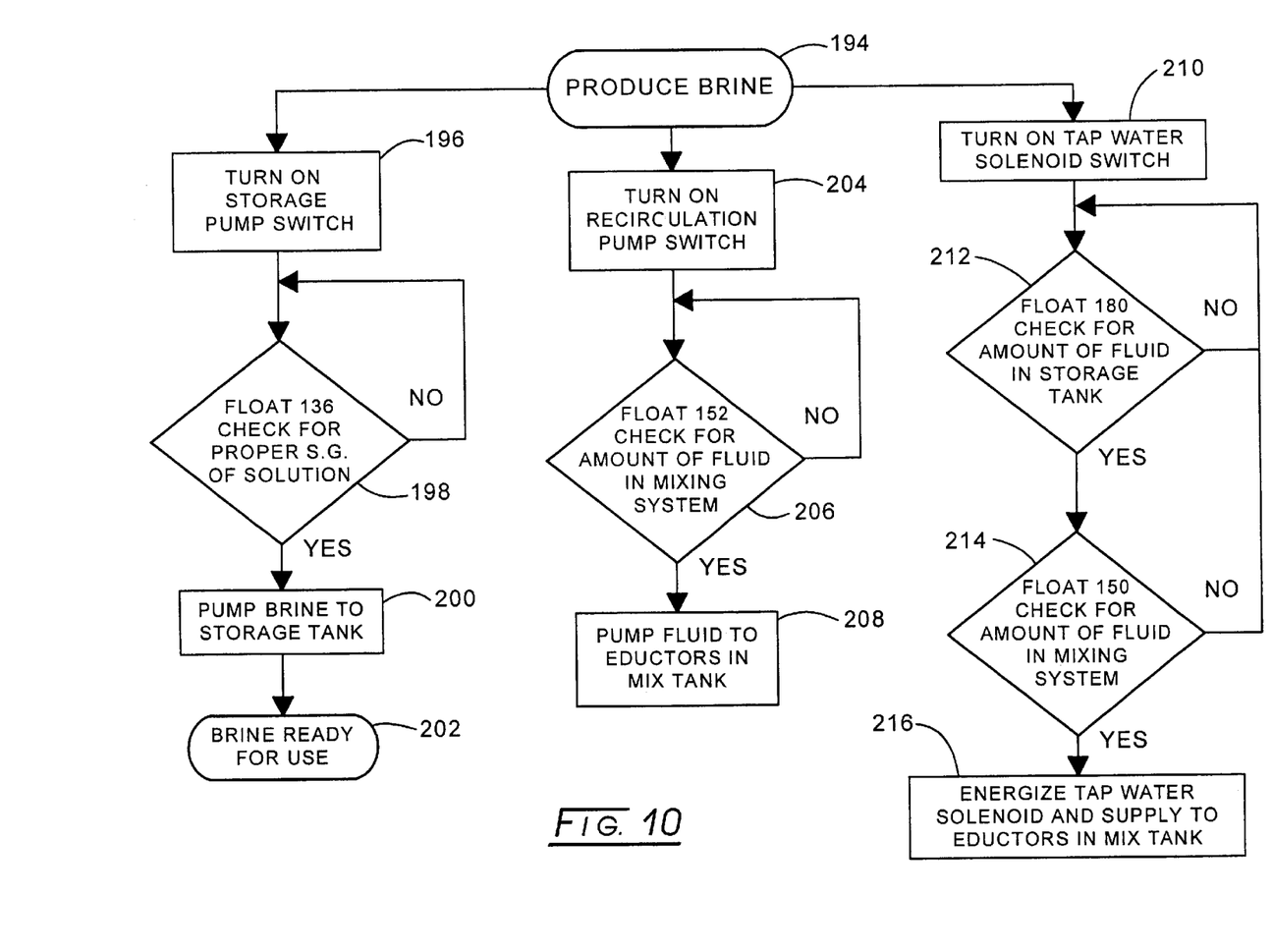
FIG. 10 is a flow sheet for the electrical schematic diagram in FIG. 8.

The operation of the system and a further understanding of the electrical schematic in FIG. 8 can be better understood by referring to the flow diagram in FIG. 10. Commencing with block 194, the operator has determined that brine needs to be produced, for example, because of a weather prediction or due to the season. At this time, block 194 calls for the operator to turn on (throw) switches 172, 174, and 176. The reader will observe that three independent operating sequences determine the operation of the brining system.

Referring initially to the left-hand flow path, block 196 indicates the throwing of switch 172, which energizes the circuit (see FIG. 8). Next, at block 198, float 136 in vessel 122 is polled to check for whether the correct specific gravity (s.g.) of the brine in vessel 122 is the same as the standard brine solution in float 136. If the answer is "no", then this step cycles until the answer is "yes". When float 136 floats in the brine in vessel 122 and switch 130 closes, block 200 shows that a signal is sent to pump 76, which pumps the brine product to storage tank 14 and block 202 indicates that the brine product is ready for use.

Referring now to the central flow path, block 204 indicates the throwing switch 176. Next, at block 206, float 152 is polled to determine whether a minimum amount of tap water has passed into vessel 122. If the answer is "no", this step cycles until the answer is "yes". If the answer is "yes", block 208 indicates that pump 24 is activated to pump water/weak brine from vessel 122 into spray nozzles 164 and 166 in mixing tank 10.

Referring now to the right-hand flow path in FIG. 8, block 210 indicates that the throwing of switch 174, which powers solenoid 60. Next, block 212 indicates that float 180 in storage tank 14 is polled. If the answer is "no", then this step cycles. If the answer is "yes", then block 214 indicates that float 180 still is closed. Block 214 next is encountered where float 150 is polled. If the answer is "no", then this step cycles. If the answer is "yes", then block 216 indicates that solenoid 60 is energized to bring in tap water for pumping to eductors (slurry spray nozzles 164 and 166 of the spray bar assembly) in mixing tank 10 to make brine. If either vessel 122 (normally closed float switch 150) or storage tank 14 (normally closed float switch 180) is full (a "no" answer at block 212 or block 214), then solenoid 216 is not energized and no make-up tap water is brought into the brine producing system. Until ideal design operating conditions, all valves, flow rates, and the like, are set and adjusted so that the amount of tap water introduced into the system is the same as the amount of brine product withdrawn from the system. Though not critical for operation, the embodiment depicted in the drawings utilizes ½" sample and recirculation lines. All other lines are 1½" lines except for a 3" balance line.

Now, a controller (CPU or computer) can operate the present system by operating the various valves, pumps, solenoid, and the corresponding flow rates of water and brine in the lines. The logic to accomplish this is set forth in FIG. 11. Commencing with block 294, the operator has determined that brine needs to be produced, for example, because of a weather prediction or due to the season. At this time, block 296 calls or the operator to turn on (throw) gfi switches 172, 174, and 176. At this point, the system at block 298 queries whether mixing tank 10 is full. If tank 10 is not full, then the system proceeds to block 300 where solenoid 60 is activated to admit tap water to flow into the system for passing into mixing tank 10.

Figure 11:
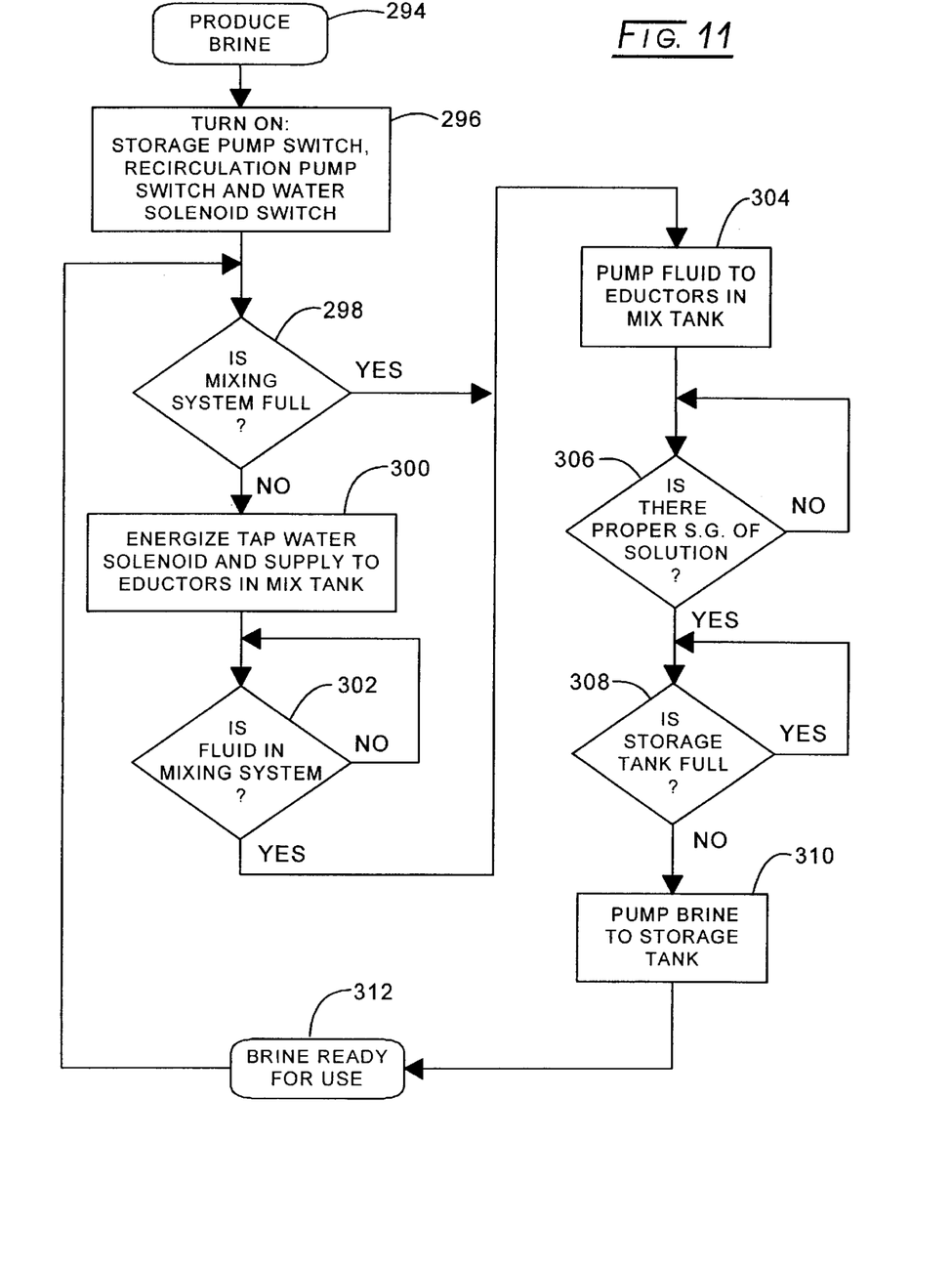
FIG. 11 is flow sheet showing the operating logic of the brine forming system of the invention.

The system then proceeds to block 302 where the presence/absence of water in mixing tank 10 is queried. If water has yet to reach mixing tank 10, then the system loops to block 302 and continues to loop until water is detected mixing tank 10. Once water is detected in mixing tank 10, the system proceeds to block 304. Block 304 also is reached if mixing tank 10 is determined to be full in block 298.

In block 304, pump 24 is activated so that weak brine is pumped to eductors (spray nozzles 164 and 166 of the spray bar assembly) in mixing tank 10. The system then proceeds to block 306 where the specific gravity (s.g.) of the brine in vessel 122 is queried. The system loops at this juncture until the correct specific gravity of the brine in vessel 122 is determined by float assembly 136.

Since the brine product now is made, the system polls storage tank 14 to see if it is full. If float assembly 180 determines that storage tank 14 is full, then the system loops and continues to loop until brine product has been withdrawn and float 180 senses the lowering of the level of the brine product in storage tank 14. Once storage tank 14 needs to be filled, the system proceeds to block 210, where solenoid 108 and pump 76 are activated. Such activation causes tap water to blend with the brine product being pumped from mixing tank 10 into storage tank 14. The brine product in block 312 now is ready for use and the system loops back to block 298. All valves, pumps, flow rates, and the like, can be set and adjusted so that the amount of tap water into the system is the same as the amount of brine product withdrawn from the system, using computer control of the system. Other modes of operation can be implemented also under such computer control regimen.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the American system (foot, pound, ° F.) and all amounts and percentages are by weight, unless otherwise expressly indicated. Also, all citations referred herein are expressly incorporated herein by reference.

What is claimed is:

1. Method for making salt brine of a desired concentration, which comprises the steps of:
   (a) passing tap water and recycle dilute brine from a sump tank located indoors into a mixing tank located outdoors;
   (b) passing a dilute brine flow from said mixing tank into said sump tank;
   (c) monitoring the concentration of said brine in said sump tank with a floatable container filled with desired concentration brine; and
   (d) as soon as said container floats in the brine in said sump tank, passing said brine in said mixing tank into a brine storage tank located outdoors.

2. The method of claim 1, wherein said desired concentration brine is at least about 23.3% salt concentration.

3. The method of claim 2, wherein said salt is NaCl.

4. The method of claim 1, wherein tap water is stopped from entering the method when either said sump tank or said storage tank is full.

5. The method of claim 1, wherein no dilute brine recycle occurs until a minimum amount of one or more of brine or tap water is in said sump tank.

6. The method of claim 1, wherein said tap water and recycle dilute brine is passed into said mixing tank via spraying with spray nozzles.

7. The method of claim 6, wherein said spray nozzles are located at the bottom of said mixing tank.

8. The method of claim 1, wherein said mixing tank can be rotated to dump out unwanted material for cleaning said mixing tank.

9. The method of claim 1, wherein step (a) is accomplished with a recirculation pump, step (d) is accomplished with a storage pump, and a solenoid controls the flow of tap water into the method.

10. The method of claim 1, which is controlled by a controller.

11. A salt brine manufacturing system, which comprises:
   (a) a mixing tank connected to a source of tap water and to a source of dilute brine;
   (b) a sump tank for supplying dilute brine to said mixing tank and fitted with a brine product sensor to determining whether the brine therein has a desired concentration of salt to make a brine product;
   (c) a recirculation pump for passing said source of tap water and said dilute brine from said sump tank to said mixing tank;
   (d) a storage tank;
   (e) a pump for passing a brine product from said mixing tank to said storage tank.

12. The salt brine manufacturing system of claim 11, wherein a solenoid controls the flow of said source of tap water into the system.

13. The salt brine manufacturing system of claim 12, wherein said sump tank is fitted with a low water sensor and high water sensor, said mixing tank and said storage tank are located outdoors and said sump tank is located indoors, and said storage tank is fitted with a high water sensor.

14. The salt brine manufacturing system of claim 13, wherein said brine product sensor in said sump tank is a floatable container containing said brine product.

15. The salt brine manufacturing system of claim 11, wherein said storage tank is fitted with a high water sensor.

16. The salt brine manufacturing system of claim 11, wherein said brine product sensor in said sump tank is a floatable container containing said brine product.

17. The salt brine manufacturing system of claim 11, wherein said storage tank is fitted with a product outlet for passing brine product therein to a truck.

18. The salt brine manufacturing system of claim 11, wherein said sump tank is fitted with a low water sensor and high water sensor.

19. The salt brine manufacturing system of claim 11, wherein said mixing tank and said storage tank are located outdoors and said sump tank is located indoors.

20. The salt brine manufacturing system of claim 11, wherein said mixing tank is fitted with a spray bar assembly disposed at the bottom of said mixing tank for spraying said source of tap water and said source of dilute brine therein.

* * * * *